United States Patent [19]
Bhopale

[11] 3,984,778
[45] Oct. 5, 1976

[54] CARRIER RECOVERY SCHEME FOR A SSB-SC SIGNAL

[75] Inventor: Arvind M. Bhopale, Beltsville, Md.

[73] Assignee: Rixon Inc., Silver Spring, Md.

[22] Filed: Nov. 13, 1974

[21] Appl. No.: 523,411

[52] U.S. Cl. .............................. 325/329; 325/49; 325/50; 329/154
[51] Int. Cl.² ................................................ H04B 1/30
[58] Field of Search .............. 325/49, 50, 329, 330, 325/331; 329/50, 122, 124, 153, 154

[56] References Cited
UNITED STATES PATENTS

| | | | |
|---|---|---|---|
| 3,391,341 | 7/1968 | Eddy | 325/49 X |
| 3,669,511 | 6/1972 | Motley et al. | 325/329 |

*Primary Examiner*—Benedict V. Safourek
*Attorney, Agent, or Firm*—Larson, Taylor and Hinds

[57] ABSTRACT

A system is provided for extracting the proper carrier phase from a single sideband suppressed carrier signal. A received signal is equalized and then product demodulated by estimated in-phase and quadrature carriers produced by a voltage controlled oscillator (VCO). The outputs of the in-phase and quadrature product demodulators are low-pass filtered producing corresponding in-phase and quadrature baseband signals. An estimator compares the in-phase baseband signal with reference levels, samples the output of the comparing circuit at the band rate and generates a sequence of estimated data signals. The error signal, which forms the input to the VCO, is produced by multiplying the recovered quadrature baseband signal with the estimated data signals and is proportional to the product of the square of the low pass filtered baseband signal and the sine of the difference between the phases of the received carrier and estimated carrier.

6 Claims, 2 Drawing Figures

CARRIER RECOVERY SCHEME FOR A SSB-SC SIGNAL

FIELD OF THE INVENTION

This invention relates to data communication systems utilizing single sideband suppressed carrier or vestigial sideband suppressed carrier modulation schemes, and more particularly, to a system for the recovery of proper phase of the carrier signal used in demodulating such signals.

BACKGROUND OF THE INVENTION

In order to properly demodulate an amplitude modulated (AM) data communications signal, a local oscillator is required in the receiver that operates in phase and frequency synchronism with the carrier signal. If a carrier signal is transmitted, a local oscillator can be phase-locked onto the carrier detected at the receiver. However, carrier transmission is an inefficient use of transmitted power since the carrier contains no useable data information. If a suppressed carrier (SC) AM transmission is used, a different phase-locking technique is necessary.

In a double sideband suppressed carrier (DSB-SC) system, a local oscillator in the receiver can be phase-locked to the carrier signal using a so-called Costas loop. (See Costas, J. P. "Synchronous Communications", Proc. IRE vol. 44 December 1956). However, the Costas loop is not suitable for phase recovery in single sideband suppressed carrier (SSB-SC) systems or vestigial sideband suppressed carrier (VSB-SC) systems having very small vestige. In general, this is due to the dependence of the quadrature components on the in-phase components of the baseband signal. Reference is made to "Application of a Costas Loop to Carrier Recovery for VSB Communication Systems," Ebert and Ho, ICC73, Conference Record, Vol. II, June 1973, for a further discussion of this point.

In U.S. Pat. No. 3,675,131 (Pickholtz) there is described a technique for carrier phase recovery in an SSB-SC system. In this system, an in-phase estimated carrier signal is generated by a local oscillator having an error signal input which is used to vary the phase of the estimated carrier. The error signal in question is proportional to $[f^2(t) + \hat{f}^2(t)]$ Sin $\phi$, where $f(t)$ and $\hat{f}(t)$ are the inverse Fourier and Hilbert transforms of the baseband spectrum, respectively, and $\phi$ is the phase error between the received carrier and the estimated carrier. The technique taught in the Pickholtz patent relies on the assumption that the Hilbert transform of the estimated baseband waveform is the same as the waveform obtained by demodulating the received waveform using an estimated carrier in phase quadrature with the in-phase estimated carrier. This assumption is only valid if the transmission channel is nearly perfect.

SUMMARY OF THE INVENTION

The present invention provides a system for the recovery of proper carrier phase from a transmitted SSB-SC or VSB-SC signal so as to maintain synchronization between the carrier signal and the signal generated by the local estimated carrier oscillator used for demodulating the transmitted signal, and does this utilizing a technique which is not based on the assumption of a perfect transmission channel.

According to the invention, a local oscillator which produces an output signal whose phase varies with an input control signal, for example, a voltage controlled oscillator (VCO), provides an in-phase estimated carrier signal. A received signal, after equalization for phase and amplitude distortion in the transmission channel, is product demodulated by a first demodulator using the in-phase estimated carrier signal and by a second demodulator using an estimated carrier signal in phase quadrature with the in-phase estimated carrier. The output of each demodulator is low pass filtered to reject double frequency components. An estimator samples the in-phase demodulated signal at the band rate, compares this sample to pre-determined reference levels, and generates a sequence of estimated baseband data signals. The control input to the VCO is an error signal which is generated by cross-correlating the output of the estimator with the filtered quadrature demodulated signal. This error signal is proportional to $f^2(t)$ sin $\phi$, where $f(t)$ is the low-pass filtered waveform of the baseband data signal, and $\phi$ is the phase error between the carrier signal and the estimated carrier signal.

Other features and advantages of the invention will be set forth in, or apparent from, the detailed description of a preferred embodiment found hereinbelow.

DESCRIPTION OF A PREFERRED EMBODIMENT

Before discussing the drawings, it is noted that a single sideband suppressed carrier signal can be expressed as a sum of in-phase and quadrature components as follows:

$$f_1(t) = f(t) \cos\omega_c t + \hat{f}(t) \sin\omega_c t$$

where $f_1(t)$ is the transmitted line signal, $f(t)$ is a band-limited analog waveform which is the response of a nearly ideal low-pass filter to an input data sequence $a_1, a_2, \ldots a_n$ which is collectively denoted $\{a_n\}$, $\hat{f}(t)$ is the Hilbert transform of $f(t)$ and $\omega_c$ is the carrier frequency. If $s(t)$ is the impulse response of a nearly ideal low-pass filter, then the waveform $f(t)$ can be expressed as $$f(t) = \sum_{n=-\infty}^{+\infty} a_n s(t-nT)$$

Figure 1:
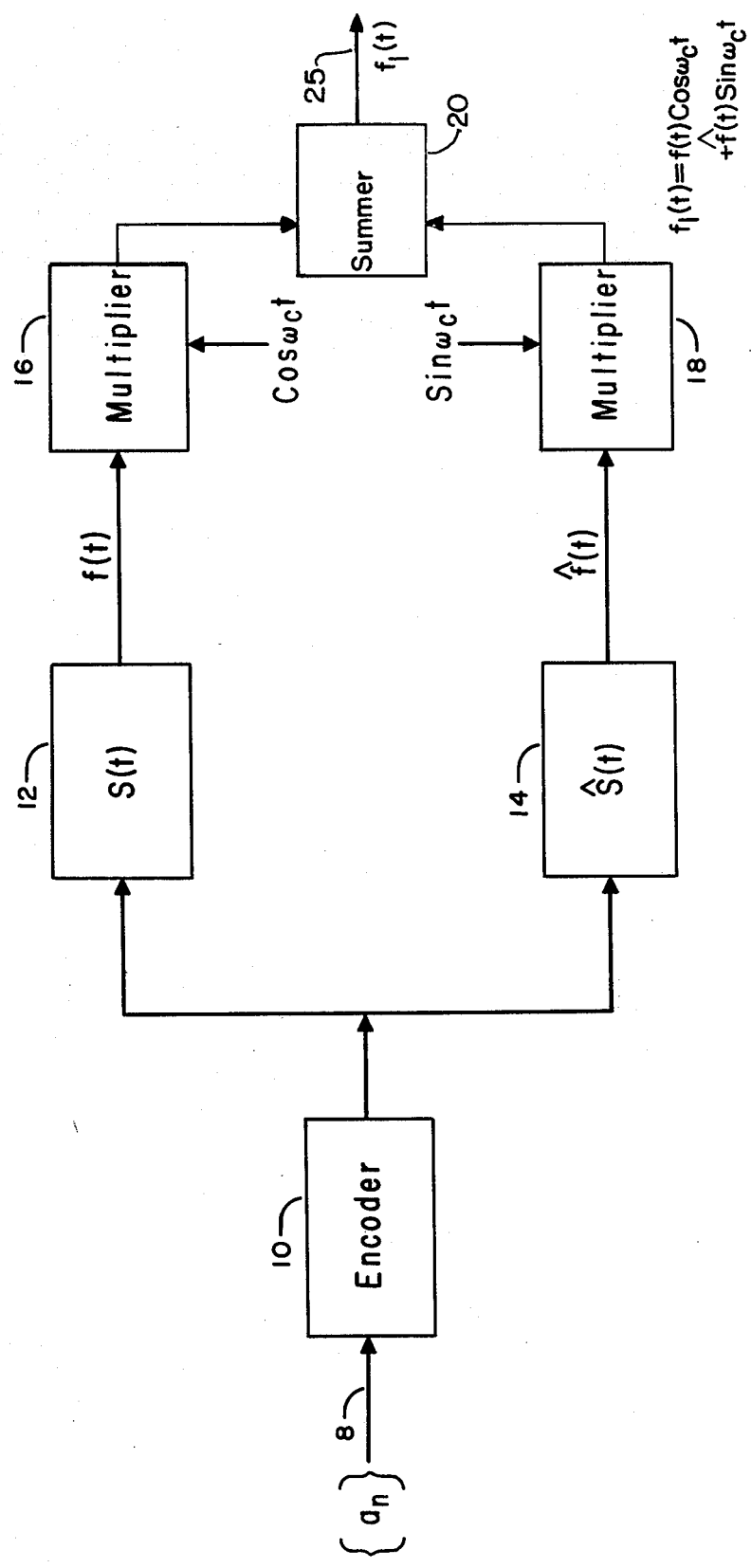
FIG. 1 is a block form circuit diagram of an SSB-SC transmitter.

Such a waveform is generated by the transmitter shown in FIG. 1. The binary data sequence $\{a_n\}$ enters an encoder 10 on an input line 8. Encoder 10 shapes sequence $\{a_n\}$ into the desired transmission pattern (e.g., bipolar binary). The output of encoder 10 is connected to first and second shaping filters 12 and 14. Filter 12 provides an $s(t)$ shaping characteristic which yields the output waveform $f(t)$ as described above. Filter 14 provides an $\hat{s}(t)$ shaping characteristic and the output of Filter 14 is the Hilbert transform of $f(t)$ which is denoted $\hat{f}(t)$.

The waveform $f(t)$ is multiplied in a multiplier circuit 16 by the function $\cos\omega_c t$ and the waveform $\hat{f}(t)$ is multiplied in a multiplier circuit 18 by the function $\sin\omega_c t$. The outputs of multiplier circuits 16 and 18 are connected to a summing circuit 20 that adds the two signals and produces an output on line 25 which is denoted $f_1(t)$ and is expressed by the equation:

$$f_1(t) = f(t)\cos\omega_c t + \hat{f}(t)\sin\omega_c t$$

Figure 2:
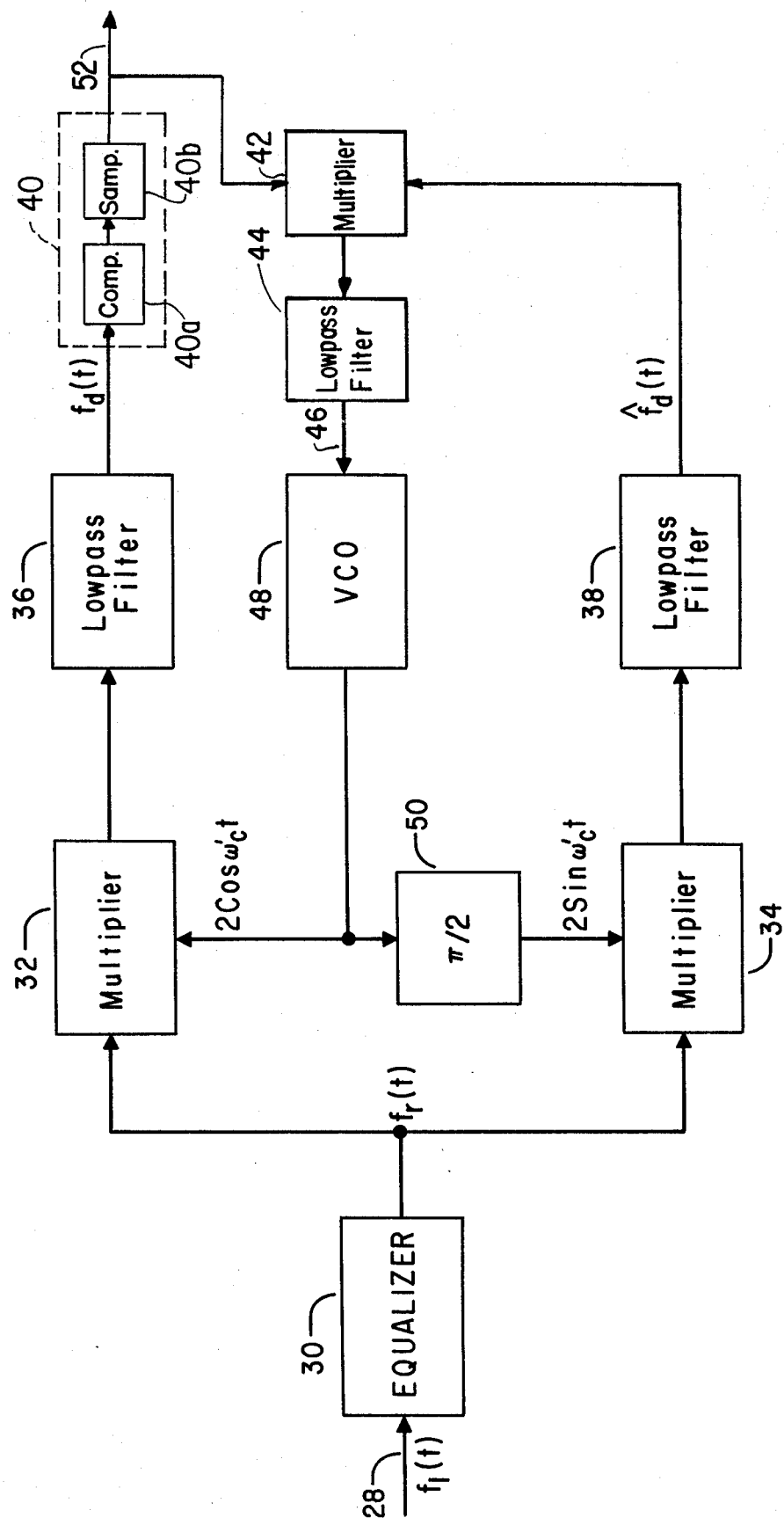
FIG. 2 is a block form circuit diagram form of a receiver system for demodulating an SSB-SC signal, according to the present invention.

Referring now to FIG. 2, a receiver is shown which receives line signal $f_1(t)$ is received on an input line 28. It will be appreciated that line signal $f_1(t)$ is subjected to amplitude and phase distortion in the transmission channel and an equalizer 30 is provided which processes the signal on line 28 to produce an equalized waveform $f_r(t)$ given by the equation:

$$f_r(t) = f(t)\cos(\omega_c' t + \phi) + \hat{f}(t)\sin(\omega_c' t + \phi)$$

where $\omega_c' t$ is the carrier frequency of the received signal after equalization and $\phi$ is the phase of the received carrier.

A local voltage controlled oscillator 48 having a control input 46 provides an estimated carrier frequency signal $2\cos\omega_c' t$. A 90° phase shifter 50 provides a quadrature estimated carrier signal $2\sin\omega_c' t$. Equalized waveform $f_r(t)$ is product demodulated in a multiplier circuit 32 by in-phase estimated carrier signal $2\cos\omega_c' t$ and passed through a low pass filter 36 to eliminate undesired second harmonics produced in multiplier circuit 32. The output of filter 36, which is denoted $f_d(t)$, can be expressed by the equation:

$$f_d(t) = f(t)\cos\phi + \hat{f}(t)\sin\phi$$

In a similar manner, equalized waveform $f_r(t)$ is product demodulated in a second multiplier circuit 34 by quadrature estimated carrier $2\sin\omega_c' t$ and filtered by a second low-pass filter 38 to eliminate undesired second harmonics produced in multiplier circuit 34. The output of filter 36, which is denoted $\hat{f}_d(t)$ can be expressed by the equation:

$$\hat{f}_d(t) = f(t)\sin\phi - \hat{f}(t)\cos\phi$$

An estimator circuit 40, connected to the output of filter 36, samples waveform $f_d(t)$ at the baud rate. Each sample of waveform $f_d(t)$ is compared to predetermined reference levels and is converted by estimator 40 into a sequence of estimated baseband data symbols $\bar{f}(nT)$. Estimated baseband data symbols $\bar{f}(nT)$ are available for further processing on an output line 52.

The design of estimator circuit 40 will vary with the shape of the incoming signal. In general, estimator circuit 40 comprises a comparator 40a in the form of a threshold detector, or slicer, and a sample circuit 40b, sampling at the baud rate. This sampling can be controlled by a circuit such as that described in U.S. application Ser. No. 172,089, entitled "Clock Recovery System." In the case of a bipolar binary signal, the threshold detector can be a simple zero crossing detector. Estimator circuits of this type are well known in the art and are further described in "Principles of Data Communications" by Luck, Salz and Weldon, published by McGraw Hill in 1968.

The $\bar{f}(nT)$ output of estimator 40 is multiplied by the output of lowpass filter 38, $\hat{f}_d(t)$, using a multiplier circuit 42, so as to generate an error signal. The output of multiplier circuit 42 is low pass filtered by a filter circuit 44 producing an error signal $e$ on output line 46 of the form:

$$e = \bar{f}(t)f(t)\sin\phi - \bar{f}(t)\hat{f}(t)\cos\phi$$

Since $\bar{f}(t)$ and $\hat{f}(t)$ are othogonal, the average of their products is zero. The average error signal is therefore proportional to $f^2(t)\sin\phi$, and approaches zero as $\phi$, the difference between the phase of the output signal of VCO 48 ($\omega_c'$) and the carrier signal ($\omega_c' + \phi$) approaches zero. Thus, the error signal on line 46 provides the required control signal for VCO 48, maintaining the signal in phase lock with the received carrier, $\omega_c'$, without the use of a transmitted carrier signal.

Although the invention has been described with respect to a exemplary embodiment thereof, it will be understood that variations and modifications can be effected in the embodiment without departing from the scope or spirit of the invention.

I claim:

1. In a single sideband suppressed carrier system, a receiver for recovering the proper carrier phase from a received single sideband suppressed carrier signal transmitted at a predetermined baud rate, said receiver comprising:

a local carrier generating means for generating an inphase estimated carrier signal having a control input, the phase of said in-phase estimated carrier signal varying with the signal level at said control input;

means for shifting said in-phase estimated carrier signal 90°, so as to form a quadrature estimated carrier signal which is in phase quadrature with said in-phase estimated carrier signal;

first demodulator means for modulating the signal received by the receiver with said in-phase estimated carrier signal so as to produce a first demodulated signal;

second demodulator means for modulating the signal received by the receiver with said quadrature estimated carrier signal so as to produce a second demodulated signal;

first and second low-pass filters connected to the outputs of said first and second demodulator means for filtering said first and second demodulator signals, respectively;

estimator means, connected to the output of said first low-pass filter, for comparing said first demodulated signal with predetermined reference levels, for sampling the output of said comparison at the baud rate and for generating a sequence of estimated data symbols; and error signal generating means, connected to said control input of said local carrier generating means, for generating, responsive to said estimated data symbols, an error signal proportional to $f^2(t)\sin\phi$, where $f(t)$ is the low-pass filtered waveform of the baseband data signal and $\phi$ is the difference in phase between said carrier of said received signal and the carrier generated by said local carrier generating means.

2. A receiver as claimed in claim 1 wherein said error signal generating means comprises a multiplying means for multiplying the output of said estimator means and said second demodulated signal.

3. A receiver as claimed in claim 2 wherein said error signal generating means further comprises a further low-pass filter connected to the output of said multiplying means, said control input of said local carrier generating means being connected to the output of said first low pass filter.

4. A receiver as claimed in claim 1 wherein said first and second demodulating means comprise product demodulators.

5. A receiver as claimed in claim 1 wherein the input of said first low-pass filter is connected in series with the output of said first demodulating means and the output of said first low-pass filter is connected to said estimator means, and the input of said second low-pass filter is connected in series with the output of said second demodulating means and the output of said second low-pass filter is connected to said error signal generating means.

6. A receiver as claimed in claim 1 wherein said local carrier generating means comprises a voltage controlled oscillator.

* * * * *